(12) United States Patent
Mauro (10) Patent No.: US 9,764,981 B2
(45) Date of Patent: Sep. 19, 2017

(54) LOW CTE ALKALI-FREE BOROALUMINOSILICATE GLASS COMPOSITIONS AND GLASS ARTICLES COMPRISING THE SAME

(71) Applicant: Corning Incorporated, Corning, NY (US)

(72) Inventor: John Christopher Mauro, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 14/380,164

(22) PCT Filed: Feb. 28, 2013

(86) PCT No.: PCT/US2013/028177
§ 371 (c)(1),
(2) Date: Aug. 21, 2014

(87) PCT Pub. No.: WO2013/130718
PCT Pub. Date: Sep. 6, 2013

(65) Prior Publication Data
US 2015/0037553 A1    Feb. 5, 2015

Related U.S. Application Data

(60) Provisional application No. 61/604,839, filed on Feb. 29, 2012.

(51) Int. Cl.
*B32B 7/00*    (2006.01)
*B32B 17/06*    (2006.01)
(Continued)

(52) U.S. Cl.
CPC ............ *C03C 3/091* (2013.01); *C03B 17/02* (2013.01); *C03B 17/064* (2013.01); *C03C 3/093* (2013.01);
(Continued)

(58) Field of Classification Search
None
See application file for complete search history.

(56) References Cited

U.S. PATENT DOCUMENTS 3,673,049 A    6/1972    Giffen et al.
3,737,294 A    6/1973    Dumbaugh, Jr. et al.
(Continued)

FOREIGN PATENT DOCUMENTS

JP    1201041    8/1989
JP    H0710598    1/1995
(Continued)

OTHER PUBLICATIONS

International Search Report and Written Opinion, dated Jul. 16, 2013, pp. 1-11, International Patent Application No. PCT/US2013/028177, European Patent Office, The Netherlands.
(Continued)

*Primary Examiner* — David Sample
*Assistant Examiner* — Nicole T Gugliotta
(74) *Attorney, Agent, or Firm* — Michael A. Hood (57) ABSTRACT

Low CTE glass compositions and glass articles formed from the same are described. In one embodiment, a glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from
(Continued)

about 3 mol. % to about 12 mol. %. The glass composition is free from alkali metals. The glass composition has a coefficient of thermal expansion which is less than or equal to $40 \times 10^{-7}/°$ C. averaged over the temperature range from about 20° C. to 300° C. The glass composition is particularly well suited for use as a glass cladding layer in a laminated glass article.

13 Claims, 1 Drawing Sheet (51) Int. Cl.
- C03C 3/091 (2006.01)
- C03B 17/02 (2006.01)
- C03B 17/06 (2006.01)
- C03C 3/093 (2006.01)

(52) U.S. Cl.
CPC ........ Y02P 40/57 (2015.11); Y10T 428/24942 (2015.01); Y10T 428/24983 (2015.01)

(56) References Cited

U.S. PATENT DOCUMENTS

| | | |
|---|---|---|
| 3,746,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,214,886 A | 7/1980 | Shay et al. |
| 4,554,259 A | 11/1985 | Franklin et al. |
| 5,116,787 A | 5/1992 | Dumbaugh, Jr. |
| 5,342,426 A | 8/1994 | Dumbaugh, Jr. |
| 5,559,060 A | 9/1996 | Dumbaugh, Jr. et al. |
| 6,096,670 A | 8/2000 | Lautenschlager et al. |
| 6,287,674 B1 | 9/2001 | Verlinden et al. |
| 6,319,867 B1 * | 11/2001 | Chacon .............. C03C 3/091 428/428 |
| 6,329,310 B1 | 12/2001 | Peuchert et al. |
| 6,417,124 B1 | 7/2002 | Peuchert et al. |
| 6,465,381 B1 | 10/2002 | Lautenschlager et al. |
| 6,680,266 B1 | 1/2004 | Peuchert et al. |
| 7,157,392 B2 | 1/2007 | Peuchert et al. |
| 7,201,965 B2 | 4/2007 | Gulati et al. |
| 7,470,642 B2 | 12/2008 | Fechner et al. |
| 7,514,149 B2 | 4/2009 | Bocko et al. |
| 7,534,734 B2 | 5/2009 | Ellison |
| 7,635,521 B2 | 12/2009 | Aitken et al. |
| 8,007,913 B2 | 8/2011 | Coppola et al. |
| 2001/0034293 A1 | 10/2001 | Peuchert et al. |
| 2001/0034294 A1 | 10/2001 | Peuchert et al. |
| 2002/0013210 A1 | 1/2002 | Peuchert et al. |
| 2002/0032117 A1 | 3/2002 | Peuchert et al. |
| 2003/0129417 A1 * | 7/2003 | Chen et al. ................. 428/432 |
| 2004/0209758 A1 | 10/2004 | Peuchert et al. |
| 2007/0190340 A1 | 8/2007 | Coppola |
| 2007/0213194 A1 | 9/2007 | Abensour |
| 2010/0151210 A1 | 6/2010 | Shimatani |
| 2011/0207594 A1 | 8/2011 | Niida et al. |
| 2011/0240499 A1 | 10/2011 | Taniguchi et al. |
| 2011/0318555 A1 | 12/2011 | Bookbinder et al. |
| 2011/0318561 A1 | 12/2011 | Murata et al. |
| 2012/0088648 A1 | 4/2012 | Ellison et al. |
| 2012/0141668 A1 | 6/2012 | Nakashima |
| 2013/0037105 A1 * | 2/2013 | Aitken et al. ................. 136/258 |
| 2014/0049708 A1 | 2/2014 | Murata et al. |
| 2015/0037552 A1 | 2/2015 | Mauro |

FOREIGN PATENT DOCUMENTS

| | | | | |
|---|---|---|---|---|
| JP | 2004-168597 | * | 6/2004 | ............ C03C 3/091 |
| JP | 2004168597 | | 6/2004 | |
| WO | 2011/136027 | | 3/2011 | |
| WO | WO 2011/136027 | * | 3/2011 | ............ G11B 5/851 |

OTHER PUBLICATIONS

English Translation of JP2014560016 Office Action dated Oct. 25, 2016; 3 pages; Japanese Patent Office.

* cited by examiner

LOW CTE ALKALI-FREE BOROALUMINOSILICATE GLASS COMPOSITIONS AND GLASS ARTICLES COMPRISING THE SAME

CROSS-REFERENCE TO RELATED APPLICATIONS

This application is a national stage entry under 35 U.S.C. §371 of International Application No. PCT/US2013/028177 filed on Feb. 28, 2013, which claims the benefit of priority under 35 U.S.C. §119 of U.S. Provisional Application No. 61/604,839 filed on Feb. 29, 2012, the content of which is relied upon and incorporated herein by reference in its entirety.

BACKGROUND

1. Field

The present specification generally relates to glass compositions and, more specifically, to low CTE alkali-free boroaluminosilicate glass compositions and glass articles comprising the same.

2. Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Glass articles are commonly strengthened by thermal tempering and/or by ion exchange treatment. In either case, the glass article is subjected to additional processing steps after the glass article is formed. These additional processing steps may increase the overall cost of the glass article. Moreover, the additional handling required to carry out these processing steps increases the risk of damage to the glass article which decreases manufacturing yields and further increases production costs and the ultimate cost of the glass article.

Accordingly, a need exists for alternative glass compositions which may be used to produce strengthened glass articles without the need for additional processing steps and glass articles manufactured from such compositions.

SUMMARY

According to one embodiment, a glass composition may include from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40 \times 10^{-7}/°$ C. over the temperature range from about 20° C. to 300° C. The glass compositions are particularly well suited for use as glass cladding layers in laminated glass articles, such as laminated glass articles formed by the fusion lamination process.

In one set of embodiments, a glass article includes a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process. The first glass cladding layer and the second glass cladding layer are formed from a glass composition which includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass cladding layers may be substantially free from alkali metals and compounds containing alkali metals. The glass cladding layers may have a coefficient of thermal expansion which is less than or equal to $40 \times 10^{-7}/°$ C. averaged over the temperature range from about 20° C. to 300° C.

Additional features and advantages of the glass compositions and glass articles formed from the glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of glass compositions having low coefficients of thermal expansion and glass articles incorporating the same, examples of which are illustrated in the accompanying drawings. Whenever possible, the same reference numerals will be used throughout the drawings to refer to the same or like parts. The glass compositions described herein generally have relatively low coefficients of thermal expansion and, as such, may be utilized in conjunction with core glass compositions having relatively high coefficients of thermal expansion to produce laminated glass articles which are compressively stressed without being ion-exchanged or thermally tempered. In one embodiment, a glass composition may include from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40 \times 10^{-7}/°$ C. averaged over the temperature range from about 20° C. to 300° C. The glass compositions and glass articles formed from the glass compositions will be described in more detail herein with specific reference to the appended drawings.

The term "liquidus viscosity," as used herein, refers to the shear viscosity of the glass composition at its liquidus temperature.

The term "liquidus temperatures," as used herein, refers to the highest temperature at which devitrification occurs in the glass composition The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, $B_2O_3$ and the like) are given in mole percent (mol. %) on an oxide basis, unless otherwise specified.

The glass compositions described herein have properties, such as the liquidus viscosity and the liquidus temperature, which make the glass compositions particularly well suited for use with fusion forming processes, such as the fusion down draw process and/or the fusion lamination process. These properties are attributable to the specific compositions of the glasses, as will be described in more detail herein.

In the embodiments of the glass compositions described herein $SiO_2$ is the largest constituent of the composition and, as such, $SiO_2$ is the primary constituent of the glass network formed from the glass compositions. Pure $SiO_2$ has a relatively low CTE and is alkali free. However, pure $SiO_2$ has an extremely high melting point. Accordingly, if the concentration of $SiO_2$ in the glass compositions described herein is too high, the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration less than or equal to about 66 mol. % in order to facilitate fusion forming the glass compositions. For example, in some embodiments, the concentration of $SiO_2$ in the glass composition is greater than or equal to about 60 mol. % and less than or equal to about 66 mol. %. In some other embodiments, $SiO_2$ is present in the glass composition in a concentration greater than or equal to about 63 mol. % and less than or equal to about 65 mol. %.

The glass compositions described herein also comprise $Al_2O_3$. $Al_2O_3$ serves as a glass network former, similar to $SiO_2$. Like $SiO_2$, $Al_2O_3$ increases the viscosity of the glass composition due to its tetrahedral coordination in a glass melt formed from the glass composition. However, when the concentration of $Al_2O_3$ is balanced against the concentration of $SiO_2$ and the concentration of alkaline earth oxides in the glass composition, $Al_2O_3$ can reduce the liquidus temperature of the glass melt, thereby enhancing the liquidus viscosity and improving the compatibility of the glass composition with certain forming processes such as the fusion forming process.

In the embodiments described herein, the concentration of $Al_2O_3$ in the glass compositions is generally less than or equal to about 10 mol. % in order to achieve compositions having the desired liquidus temperature. For example, in some embodiments, the concentration of $Al_2O_3$ in the glass compositions is greater than or equal to about 7 mol. % and less than or equal to about 10 mol. %. In some of these embodiments, the concentration of $Al_2O_3$ in the glass compositions may be less than or equal to about 9 mol. % or even less than or equal to about 8 mol. %. For example, in some embodiments, the concentration of $Al_2O_3$ in the glass compositions is greater than or equal to about 7 mol. % and less than or equal to about 9 mol. % or even greater than or equal to about 7 mol. % and less than or equal to about 8 mol. %.

The glass compositions in the embodiments described herein further comprise $B_2O_3$. Like $SiO_2$ and $Al_2O_3$, $B_2O_3$ contributes to the formation of the glass network. $B_2O_3$ is added to the glass compositions to decrease the viscosity and liquidus temperature of the glass compositions. Specifically, an increase in the concentration of $B_2O_3$ by 1 mol. % may decrease the temperature required to obtain an equivalent viscosity by 10° C. to 14° C., depending on the specific composition of the glass. However, $B_2O_3$ can lower the liquidus temperature of a glass composition by 18° C. to 22° C. per mol. % of $B_2O_3$. As such, $B_2O_3$ decreases the liquidus temperature of the glass composition more rapidly than it decreases the liquidus viscosity of the glass compositions. $B_2O_3$ is also added to the glass composition to soften the glass network. Moreover, when the glass compositions are used for glass cladding layers in a fusion formed laminated glass article, the $B_2O_3$ in the glass cladding layers is utilized to match the viscosity of the glass cladding layers to that of the glass core layer, particularly when the glass core layer in an alkali-containing glass core layer. Further, additions of $B_2O_3$ to the glass composition also reduce the Young's modulus of the glass composition and improve the intrinsic damage resistance of the glass.

In the embodiments described herein, $B_2O_3$ is generally present in the glass compositions in a concentration greater than or equal to about 14 mol. %. For example, in some embodiments, $B_2O_3$ is present in the glass compositions in a concentration greater than or equal to about 14 mol. % and less than or equal to about 18 mol. %. In some of these embodiments, the concentration of $B_2O_3$ in the glass compositions may be less than or equal to about 17 mol. % or even less than or equal to about 16 mol. %. In other embodiments described herein, $B_2O_3$ is present in the glass compositions in a concentration greater than or equal to about 16 mol. % and less than or equal to about 17 mol. %.

The glass compositions described herein also include at least one alkaline earth oxide. The alkaline earth oxide generally improves the melting behavior of the glass compositions by lowering the temperature required for melting. Moreover, a combination of several different alkaline earth oxides assists in lowering the liquidus temperature of the glass compositions and increases the liquidus viscosity of the glass compositions. The alkaline earth oxides included in the glass compositions described herein are CaO, MgO, SrO and combinations thereof.

In the embodiments described herein, the alkaline earth oxide is present in the glass composition in a concentration greater than or equal to about 9 mol. % and less than or equal to about 16 mol. %. In some embodiments, the glass composition may comprise from about 11 mol. % to about 12 mol. % alkaline earth oxide. In each of the embodiments described herein, the glass compositions include at least CaO as an alkaline earth oxide in a concentration greater than or equal to about 3 mol. % and less than or equal to about 12 mol. %. In some embodiments, the concentration of CaO may be greater than or equal to about 7 mol. % and less than or equal to about 12 mol. %. The alkaline earth oxide may further include MgO in a concentration greater than or equal to about 0 mol. % and less than or equal to about 6 mol. %. In some embodiments the concentration of MgO in the glass composition may be greater than or equal to about 2 mol. % and less than or equal to about 4 mol. %. The alkaline earth oxide in the glass composition may also include SrO in a concentration greater than or equal to about 0 mol. % and less than or equal 6 mol. %. In some embodiments, the SrO may be present in the glass composition in a concentration from about 1 mol. % to about 4 mol. %.

In all the embodiments of the glass compositions described herein, the glass compositions are substantially free from alkali metals and compounds containing alkali metals. Accordingly, it should be understood that the glass compositions described herein are substantially free from alkali oxides such as $K_2O$, $Na_2O$ and $Li_2O$.

The glass compositions described herein may optionally include one or more fining agents. The fining agents may include, for example, $SnO_2$, $As_2O_3$, $Sb_2O_3$ and combinations thereof. The fining agents may be present in the glass compositions in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

In some embodiments described herein, the glass compositions may further comprise trace amounts of $Fe_2O_3$ and/or $ZrO_2$. For example, in some embodiments, the glass compositions may comprise $Fe_2O_3$ in a concentration greater than or equal to 0 mol. % and less than or equal to 0.2 mol. %. Alternatively or additionally, the glass compositions may comprise $ZrO_2$ in a concentration greater than or equal to 0 mol. % and less than or equal to about 0.08 mol. %.

In some embodiments described herein, the glass compositions are substantially free of heavy metals and compounds containing heavy metals. Glass compositions which are substantially free from heavy metals and compounds containing heavy metals may also be referred to as "Super-Green" glass compositions. The term "heavy metals," as used herein, refers to Ba, As, Sb, Cd, and Pb.

The glass compositions described herein generally have a coefficient of thermal expansion (CTE) which is less than or equal to about $40\times10^{-7}/°$ C. averaged over a range from 20° C. to 300° C. In some embodiments, the CTE of the glass compositions may be less than or equal to about $37\times10^{-7}/°$ C. in a range from 20° C. to 300° C. In yet other embodiments, the CTE of the glass compositions may be less than or equal to about $35\times10^{-7}/°$ C. in a range from 20° C. to 300° C. The relatively low CTE values of the glass compositions are attributable, at least in part, to the absence of alkali oxides, such as $K_2O$, $Na_2O$, and $Li_2O$ which raise the CTE of the glass composition. These relatively low CTEs make the glass compositions particularly well suited for use as glass cladding layers of a fusion-formed laminated glass article. Specifically, when low CTE glass cladding layers are paired with a glass core layer having a higher CTE during a fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article without the need for an ion exchange treatment.

The glass compositions described herein have a liquidus viscosity which renders them suitable for use in a fusion draw process and, in particular, for use as a glass cladding composition in a fusion laminate process. In some embodiments, the liquidus viscosity is greater than or equal to about 50 kPoise. In some other embodiments, the liquidus viscosity may be greater than or equal to 100 kPoise or even greater than or equal to 250 kPoise.

As noted hereinabove, the addition of $B_2O_3$ to the glass compositions decreases the Young's modulus of the glass compositions which, in turn, improves the intrinsic damage resistance of the glass. In the embodiments described herein, the glass compositions generally have Young's moduli which are less than or equal to about 10.5 MPsi. In some embodiments, the glass compositions may have Young's moduli which are less than 10 MPsi or even less than 9 MPsi.

Based on the foregoing, it should be understood that various embodiments of low CTE glass compositions are disclosed herein. In a first exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a second exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes CaO and at least one of MgO and SrO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a third exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 11 mol. % to about 12 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a fourth exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes at least CaO. The alkaline earth oxide may further include at least one of MgO and SrO. The CaO may be present in the glass composition in a concentration from about 3 mol. % to about 12 mol. %. The MgO may be present in the glass composition in a concentration from about 0 mol. % to about 6 mol. %. The SrO may be present in the glass composition in a concentration from about 0 mol. % to about 6 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a fifth exemplary embodiment, the glass composition includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition may further include from about 9 mol. % to about 16 mol. % alkaline earth oxide. The alkaline earth oxide includes CaO, MgO and SrO. The CaO may be present in the glass composition in a concentration from about 3 mol. % to about 12 mol. %. The MgO may be present in the glass composition in a concentration from about 2 mol. % to about 4 mol. %. The SrO may be present in the glass composition in a concentration from about 1 mol. % to about 4 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a sixth exemplary embodiment, the glass composition includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition may further include from about 9 mol. % to about 16 mol. % alkaline earth oxide. The alkaline earth oxide includes CaO, MgO, and SrO. The CaO may be present in the glass composition in a concentration from about 3 mol. % to about 12 mol. %. The MgO may be present in the glass composition in a concentration from about 2 mol. % to about 4 mol. %. The SrO may be present in the glass composition in a concentration from about 1 mol. % to about 4 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

In a seventh exemplary embodiment, the glass composition includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals. The glass composition has a coefficient of thermal expansion which is less than or equal to $40\times10^{-7}/°$ C. averaged over the temperature range from about 20° C. to 300° C.

While exemplary glass compositions have been described hereinabove with reference to specific compositional ranges for various constituent components (such as $SiO_2$, $Al_2O_3$, $B_2O_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

Figure 1:
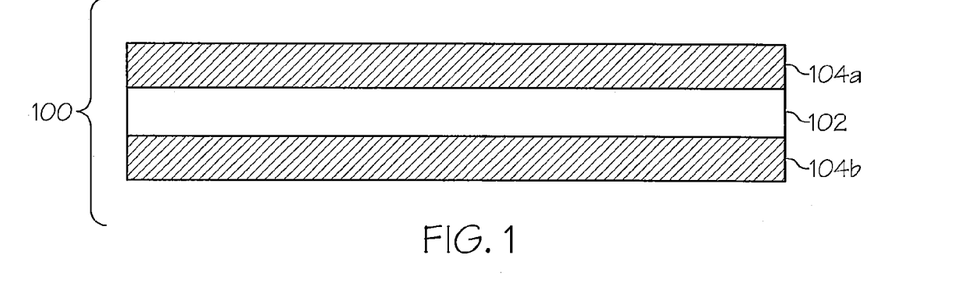
FIG. 1 schematically depicts a cross section of a laminated glass article according to one or more embodiments shown and described herein.

Referring now to FIG. 1, the glass compositions described herein may be used to form a glass article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass claddings layers due to their relatively low coefficients of thermal expansion, as will be discussed in more detail herein.

FIG. 1 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, being disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass cladding layers 104a, 104b are formed from a first glass composition having an average cladding coefficient of thermal expansion $CTE_{clad}$ and the glass core layer 102 is formed from a second, different glass composition which has an average coefficient of thermal expansion $CTE_{core}$. The $CTE_{core}$ is greater than $CTE_{clad}$ which results in the glass cladding layers 104a, 104b being compressively stressed without being ion exchanged or thermally tempered.

Figure 2:
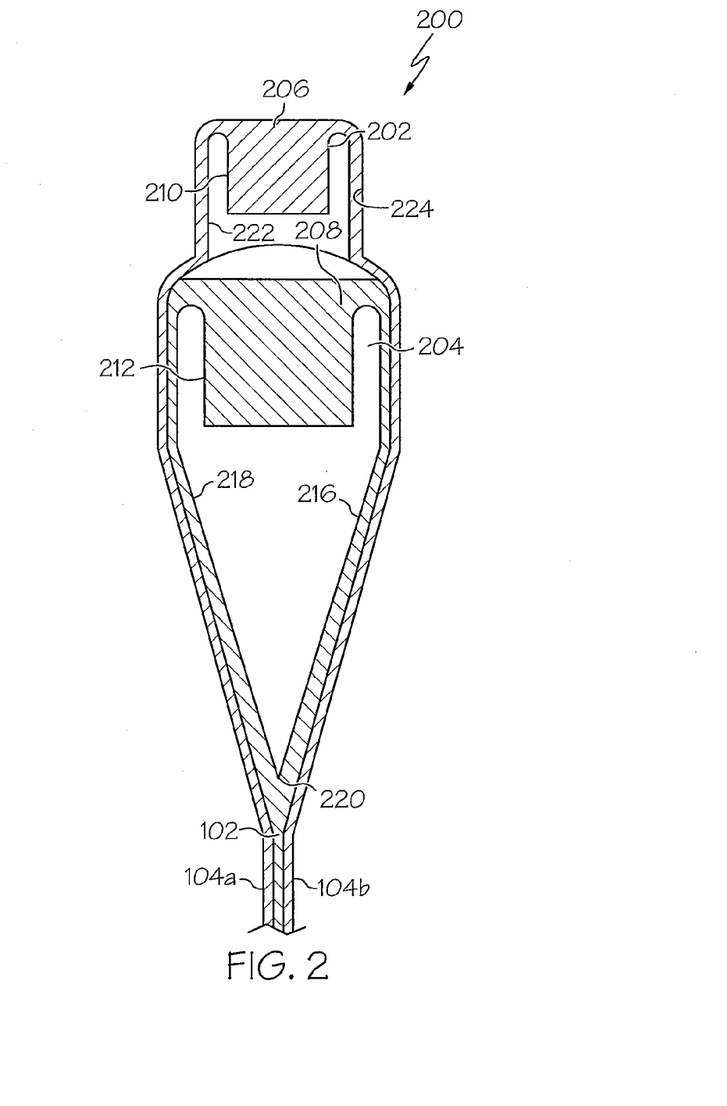
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$ which is greater than the average coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or a thermal tempering treatment.

Referring again to the laminated glass article 100 depicted in FIG. 1, the glass cladding layers 104a, 104b of the laminated glass article 100 are formed from a glass composition with a relatively low average coefficient of thermal expansion, such as the glass compositions described herein which have coefficients of thermal expansion less than or equal to $40 \times 10^{-7}/°$ C.

For example, in one embodiment, the glass cladding layer is formed from a glass composition having a low CTE, such as the glass compositions described hereinabove which comprise from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition used for the glass cladding layers may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition used in these glass cladding layers may be substantially free from alkali metals and compounds containing alkali metals.

In another exemplary embodiment, the glass cladding layer may be formed from a glass composition with a low CTE, such as the glass composition described hereinabove which includes from about 63 mol. % to about 65 mol. % $SiO_2$; from about 7 mol. % to about 10 mol. % $Al_2O_3$; and from about 16 mol. % to about 17 mol. % $B_2O_3$ as glass network formers. The glass composition used for the glass cladding layers may further include from about 9 mol. % to about 16 mol. % alkaline earth oxide. The alkaline earth oxide includes a combination of CaO, MgO, and SrO. The CaO may be present in the glass composition in a concentration from about 3 mol. % to about 12 mol. %. The MgO may be present in the glass composition in a concentration from about 2 mol. % to about 4 mol. %. The SrO may be present in the composition in a concentration form about 1 mol. % to about 4 mol. %. The glass composition used in these glass cladding layers may be substantially free from alkali metals and compounds containing alkali metals.

While specific glass compositions for use as the glass cladding layers 104a, 104b have been described herein, it should be understood that any of the glass compositions described herein may be used to form the glass cladding layers 104a, 104b of the laminated glass article 100.

Further, while the glass cladding layers 104a, 104b of the laminated glass article 100 have been described hereinabove as being formed from a glass composition having a relatively low average coefficient of thermal expansion, the glass core layer 102 of the glass article 100 is formed from a glass composition which has a higher average coefficient of thermal expansion than the glass cladding layers 104a, 104b to facilitate the development of compressive stress in the cladding layers upon cooling of the laminate article following fusion formation. For example, the glass core layer may be formed from a glass composition comprising alkali ions, such as a glass composition described in co-pending U.S. Patent Application No. 61/604,869 entitled "High CTE Potassium Borosilicate Core Glasses and Glass Articles Comprising the Same" assigned to Corning Incorporated, which have coefficients of thermal expansion greater than or equal to $75 \times 10^{-7}/°$ C. in a temperature range from 20° C. to 300° C. For example, the core glass layer may be formed from a glass composition which comprises: from about 70 mol. % to about 80 mol. % $SiO_2$; from about 0 mol. % to about 8 mol. % $Al_2O_3$; from about 3 mol. % to about 10 mol. % $B_2O_3$; from about 0 mol. % to about 2 mol. % $Na_2O$; from about 10 mol. % to about 15 mol. % $K_2O$; and from about 5 mol. % to about 6 mol. % of alkaline earth oxide, wherein the alkaline earth oxide is at least one of CaO, SrO, and BaO without containing MgO. However, it should be understood that other glass compositions may also be used to form the glass core layer 102 of the laminated glass article 100, so long as the average coefficient of thermal expansion of the glass core layer 102 is greater than the average coefficient of thermal expansion of the glass cladding layers 104a, 104b.

EXAMPLES

The various embodiments of the glass compositions described herein will be further clarified by the following examples.

A plurality of exemplary glass compositions were prepared according to the batch compositions listed in Tables 1-3 below. Batches of the oxide constituent components were mixed, melted and formed into glass plates. The properties of the glass melt (i.e., liquidus temperature, annealing point, etc.) and the resultant glass article were measured and the results are reported in Tables 1-3.

Referring to Tables 1-3 the composition and properties of inventive glass compositions (i.e., Examples A1-A26) and comparative glass compositions (i.e., Examples C1-C4) are provided. As indicated in the Tables, Examples A1 and A3-A26 each exhibited a relatively high liquidus viscosity (greater than about 50 kPoise), and a relatively low coefficient of thermal expansion (less than or equal to about $40 \times 10^{-7}/°$ C.) which makes the glass compositions well suited for use with fusion forming processes and, in particular, for use as glass cladding layers in fusion-formed laminated glass articles. These glasses also exhibited a relatively high annealing point (greater than about 650° C.) which makes the glasses less susceptible to stress relaxation upon exposure to elevated temperatures following strengthening.

The glass composition identified as Example A2 falls within the inventive glass compositions described herein. However, this glass composition exhibited a liquidus viscosity which was slightly lower than 50 kPoise. While not wishing to be bound by theory, it is believed that this relatively low liquidus viscosity is due, at least in part, to the concentration of tin ($SnO_2$) in the composition relative to the other constituent components in this particular composition.

Referring to Table 3, the properties of Comparative Examples C1-C4 are provided. Comparative Examples C1-C4 each included higher concentrations of $Al_2O_3$. This increase in the $Al_2O_3$ concentration resulted in a decrease in the liquidus viscosity due to an imbalance between the concentration $Al_2O_3$, the concentration of $SiO_2$, and the concentration of the alkaline earth oxides.

TABLE 1

Exemplary Glass Compositions

| Analyzed (mol %) | A1 | A2 | A3 | A4 | A5 | A6 | A7 | A8 | A9 | A10 |
|---|---|---|---|---|---|---|---|---|---|---|
| $SiO_2$ | 62.89 | 63.13 | 61.61 | 61.09 | 62.44 | 62.21 | 60.88 | 64.30 | 61.88 | 60.86 |
| $B_2O_3$ | 16.23 | 16.55 | 16.81 | 16.89 | 16.54 | 16.32 | 16.72 | 14.39 | 17.76 | 16.05 |
| $Al_2O_3$ | 7.32 | 8.45 | 8.00 | 8.96 | 8.11 | 8.23 | 7.51 | 7.50 | 7.11 | 7.17 |
| MgO | 2.54 | 2.54 | 2.94 | 2.85 | 2.42 | 3.56 | 2.79 | 2.61 | 2.50 | 3.01 |
| CaO | 9.54 | 8.12 | 8.39 | 8.96 | 8.46 | 8.88 | 10.66 | 9.78 | 9.39 | 11.31 |
| SrO | 1.31 | 1.04 | 2.08 | 1.07 | 1.87 | 0.62 | 1.36 | 1.34 | 1.29 | 1.52 |
| $ZrO_2$ | 0.02 | 0.02 | 0.02 | 0.02 | 0.02 | 0.02 | 0.01 | 0.01 | 0.01 | 0.01 |
| $SnO_2$ | 0.15 | 0.15 | 0.15 | 0.16 | 0.15 | 0.15 | 0.07 | 0.07 | 0.07 | 0.07 |
| Total | 100 | 100 | 100 | 100 | 100 | 100 | 100 | 100 | 100 | 100 |
| AMPL Anneal (C.): | 670 | 670 | 670 | 670 | 670 | 670 | 700 | 700 | 700 | 700 |
| Anneal Pt (C.): | 688 | 689 | 692 | 681 | 678 | 686 | 675 | 680 | 664 | 672 |
| Strain Pt (C.): | 648 | 642 | 645 | 640 | 637 | 643 | 636 | 638 | 626 | 634 |
| Fiber Soft Pt (C.): |  |  |  |  |  |  | 971.4 | 969.4 | 968.6 | 972 |
| PPV Soft Pt (C.): | 990.6 | 933.2 | 955.6 | 925.9 | 945.8 | 971.5 | 995 | 990.5 | 968.2 | 1007.5 |
| Log[Eta_inf (Pa-s)]: | −1.95 | −2.38 | −1.94 | −2.57 | −2.39 | −2.31 | −4.72 | −4.40 | −4.37 | −5.02 |
| Tg (C.): | 688.1 | 694.2 | 699.2 | 680.5 | 680.8 | 689.2 | 669.6 | 681.7 | 664.4 | 669.9 |
| Fragility: | 39.43 | 37.19 | 40.18 | 36.69 | 37.39 | 38.04 | 31.33 | 31.77 | 32.48 | 31.88 |
| Density (g/cm$^3$): | 2.38 | 2.351 | 2.387 | 2.367 | 2.382 | 2.359 | 2.385 | 2.394 | 2.365 | 2.41 |
| CTE ($\times 10^{-7}$/C.): | 35.8 | 33.9 | 35.6 | 35.8 | 36.3 | 35.3 | 37.7 | 37.1 | 37.5 | 39.7 |
| Liquidus Temp (C.): | 995 | 1130 | 1045 | 1070 | 1050 | 1070 | 995 | 1030 | 990 | 1055 |
| Primary Devit Phase: | Cassiterite | Cassiterite | Cassiterite | Cassiterite | Cassiterite | Cassiterite | Cristobalite | Cristobalite | Cristobalite | Cristobalite |
| Liquidus Visc (Poise): | 7.00E+05 | 4.74E+04 | 2.16E+05 | 1.23E+05 | 1.79E+05 | 1.25E+05 | 1.64E+06 | 9.00E+05 | 1.15E+06 | 2.30E+05 |
| Poisson's Ratio: | 0.242 | 0.235 | 0.233 | 0.239 | 0.237 | 0.24 | 0.245 | 0.233 | 0.242 | 0.241 |
| Shear Modulus (Mpsi): | 4.019 | 3.896 | 3.994 | 3.96 | 3.993 | 3.983 | 4.025 | 4.121 | 3.906 | 4.148 |
| Young's Modulus (Mpsi): | 9.979 | 9.62 | 9.847 | 9.814 | 9.882 | 9.877 | 10.024 | 10.158 | 9.702 | 10.299 |
| Indentation Threshold (gf): |  |  |  |  |  |  |  |  |  |  |

TABLE 2

Exemplary Glass Compositions

| Analyzed (mol %) | A11 | A12 | A13 | A14 | A15 | A16 | A17 | A18 | A19 | A20 |
|---|---|---|---|---|---|---|---|---|---|---|
| $SiO_2$ | 64.63 | 62.67 | 62.78 | 63.04 | 63.24 | 62.74 | 61.15 | 63.17 | 64.25 | 64.43 |
| $B_2O_3$ | 16.29 | 16.40 | 16.55 | 16.00 | 15.77 | 16.65 | 15.94 | 15.89 | 16.16 | 16.19 |
| $Al_2O_3$ | 7.49 | 7.30 | 7.26 | 7.34 | 7.35 | 7.29 | 9.32 | 7.32 | 7.45 | 7.44 |
| MgO | 2.20 | 3.62 | 2.54 | 4.62 | 3.62 | 0.51 | 2.57 | 1.54 | 2.18 | 3.91 |
| CaO | 8.18 | 7.59 | 7.47 | 7.59 | 9.65 | 9.43 | 9.62 | 11.76 | 3.20 | 3.98 |
| SrO | 1.13 | 2.34 | 3.33 | 1.32 | 0.29 | 3.31 | 1.32 | 0.29 | 6.68 | 3.99 |
| $ZrO_2$ | 0.01 | 0.01 | 0.01 | 0.01 | 0.01 | 0.01 | 0.01 | 0.01 | 0.01 | 0.01 |
| $SnO_2$ | 0.07 | 0.07 | 0.07 | 0.07 | 0.07 | 0.07 | 0.07 | 0.01 | 0.06 | 0.07 |
| Total | 100 | 100 | 100 | 100 | 100 | 100 | 100 | 100 | 100 | 100 |
| AMPL Anneal (C.): | 700 | 700 | 700 | 700 | 700 | 700 | 700 | 700 | 670 | 670 |
| Anneal Pt (C.): | 668 | 671 | 669 | 676 | 673 | 670 | 675 | 674 | 670 | 670 |
| Strain Pt (C.): | 624 | 631 | 628 | 635 | 634 | 630 | 631 | 634 | 625 | 625 |
| Fiber Soft Pt (C.): | 951 | 961.7 | 950.6 | 987.6 | 981.5 | 935 | 891.6 | 982.2 | 898.4 | 941.8 |
| PPV Soft Pt (C.): | 972.6 | 988.3 | 973.5 | 1001.9 | 1006.4 | 964.2 | 910 | 997.2 | | |
| Log[Eta_inf (Pa-s)]: | −2.93 | −4.26 | −4.05 | −4.60 | −4.97 | −2.01 | −2.94 | −4.53 | −2.19 | −3.13 |
| Tg (C.): | 714.3 | 677.6 | 673.7 | 680.3 | 671.2 | 676.4 | 685.2 | 671.0 | 673.6 | 700.0 |
| Fragility: | 36.58 | 32.64 | 33.08 | 31.76 | 30.78 | 38.72 | 36.70 | 31.70 | 36.42 | 35.37 |
| Density (g/cm^3): | 2.344 | 2.388 | 2.411 | 2.362 | 2.352 | 2.422 | 2.388 | 2.363 | 2.441 | 2.391 |
| CTE (×10^−7/C.): | 35.5 | 37.2 | 38.3 | 35.8 | 36.2 | 39.1 | 37.2 | 37 | 37.5 | 36 |
| Liquidus Temp (C.): | 960 | 1040 | 990 | 1035 | 1040 | 995 | 975 | 1025 | 950 | 960 |
| Primary Devit Phase: | Cristobalite | Cristobalite | Cristobalite | Cristobalite | Cristobalite | Cristobalite | Cristobalite | Cristobalite | Cristobalite | Cristobalite |
| Liquidus Visc (Poise): | 1.06E+07 | 4.51E+05 | 1.49E+06 | 7.00E+05 | 5.50E+05 | 5.31E+05 | 1.73E+06 | 6.78E+05 | 3.31E+06 | 7.49E+06 |
| Poisson's Ratio: | 0.234 | 0.231 | 0.239 | 0.234 | 0.242 | 0.225 | 0.239 | 0.238 | 0.239 | 0.243 |
| Shear Modulus (Mpsi): | 3.862 | 4 | 4.02 | 3.991 | 3.993 | 4.078 | 4.058 | 4.061 | 3.946 | 3.894 |
| Young's Modulus (Mpsi): | 9.533 | 9.851 | 9.966 | 9.852 | 9.915 | 9.991 | 10.059 | 10.052 | 9.776 | 9.679 |
| Indentation Threshold (gf): | | | | | | | | | 300-400 | 400-500 |

TABLE 3

Exemplary Glass Compositions

| Analyzed (mol %) | A21 | C1 | C2 | A22 | A23 | A24 | A25 | A26 | C3 | C4 |
|---|---|---|---|---|---|---|---|---|---|---|
| $SiO_2$ | 63.03 | 60.93 | 60.17 | 63.37 | 63.82 | 63.76 | 63.78 | 63.87 | 63.71 | 63.61 |
| $B_2O_3$ | 16.24 | 17.60 | 17.99 | 16.39 | 15.74 | 15.49 | 15.35 | 14.93 | 14.75 | 14.60 |
| $Al_2O_3$ | 9.13 | 11.10 | 12.53 | 7.59 | 9.15 | 9.45 | 9.65 | 9.92 | 10.23 | 10.47 |
| MgO | 3.83 | 2.05 | 1.04 | 3.47 | 3.70 | 3.73 | 3.68 | 3.70 | 3.71 | 3.73 |
| CaO | 3.86 | 3.12 | 4.11 | 3.49 | 3.76 | 3.76 | 3.74 | 3.76 | 3.77 | 3.76 |
| SrO | 3.84 | 5.11 | 4.09 | 5.61 | 3.75 | 3.73 | 3.72 | 3.74 | 3.76 | 3.75 |
| $ZrO_2$ | 0.01 | 0.01 | 0.01 | 0.01 | 0.01 | 0.01 | 0.01 | 0.01 | 0.01 | 0.01 |
| $SnO_2$ | 0.07 | 0.07 | 0.07 | 0.07 | 0.07 | 0.07 | 0.07 | 0.07 | 0.06 | 0.07 |
| Total | 100 | 100 | 100 | 100 | 100 | 100 | 100 | 100 | 100 | 100 |
| AMPL Anneal (C.): | 670 | 670 | 670 | 670 | 670 | 670 | 670 | 670 | 670 | 670 |
| Anneal Pt (C.): | 676 | 675 | 677 | 670 | 681 | 680 | 685 | 690 | 692 | 695 |
| Strain Pt (C.): | 628 | 622 | 626 | 625 | 632 | 630 | 634 | 641 | 642 | 644 |

TABLE 3-continued

Exemplary Glass Compositions

| Analyzed (mol %) | A21 | C1 | C2 | A22 | A23 | A24 | A25 | A26 | C3 | C4 |
|---|---|---|---|---|---|---|---|---|---|---|
| Fiber Soft Pt (C.): | 914.1 | 910.9 | 908.5 | 922.4 | 913.6 | 915.2 | 920 | 920.9 | 927.8 | 927.8 |
| PPV Soft Pt (C.): | | | | | | | | | | |
| Log[Eta_inf (Pa-s)]: | −2.93 | −3.32 | −3.23 | −2.37 | −2.93 | −2.93 | −2.93 | −2.93 | −2.93 | −2.93 |
| Tg (C.): | 687.9 | 676.0 | 687.9 | 679.0 | 688.9 | 699.0 | 696.4 | 705.2 | 702.3 | 710.2 |
| Fragility: | 34.80 | 33.66 | 35.29 | 36.09 | 34.54 | 35.26 | 34.94 | 35.58 | 35.42 | 35.82 |
| Density (g/cm$^3$): | 2.384 | 2.4 | 2.388 | 2.419 | 2.385 | 2.386 | 2.391 | 2.393 | 2.397 | 2.4 |
| CTE (×10$^{-7}$/C.): | 34 | 34.2 | 33.5 | 36.7 | | | | | | |
| Liquidus Temp (C.): | 940 | 1135 | 1250 | 960 | | | | | | |
| Primary Devit Phase: | Cristobalite | Mullite | Mullite | Cristobalite | | | | | | |
| Liquidus Visc (Poise): | 1.10E+07 | 4.67E+04 | 4.79E+03 | 3.12E+06 | | | | | | |
| Poisson's Ratio: | 0.252 | 0.254 | 0.256 | 0.24 | | | | | | |
| Shear Modulus (Mpsi): | 3.89 | 3.778 | 3.807 | 3.913 | | | | | | |
| Young's Modulus (Mpsi): | 9.741 | 9.473 | 9.566 | 9.702 | | | | | | |
| Indentation Threshold (gf): | 500-600 | 500-600 | 600-700 | 400-500 | | | | | | |

It should now be understood that the glass compositions described herein have relatively low coefficients of thermal expansion. As such, the glass compositions described herein are particularly well suited for use in conjunction with glass compositions with relatively high coefficients of thermal expansion to form a compressively stressed laminated glass article by the fusion laminate process. These glass articles may be employed in a variety of consumer electronic devices including, without limitation, mobile telephones, personal music players, tablet computers, LCD and LED displays, automated teller machines and the like.

It should also be understood that the properties of the glass compositions described herein, (e.g., the liquidus viscosity, the liquidus temperature, and the like) make the glass compositions well suited for use with fusion forming processes, such as the fusion down draw process or the fusion lamination process.

Moreover, the glass compositions described herein are free from alkali metals. As such, the glass compositions described herein may be particularly well suited for use as backplane substrates of LCD, LED and OLED displays where the presence of alkali metals may damage the thin film transistor deposited on the backplane substrate. The glass compositions described herein may be used to form the entire backplane substrate or, alternatively, may be used as cladding glasses in a laminated glass substrate which includes an alkali containing glass core.

Further, while specific reference has been made herein to the use of the glass compositions as cladding layers of a laminated glass article, it should be understood that the glass compositions may also be used to independently form glass articles (i.e., non-laminated glass articles), such as, for example, cover glasses for electronic devices, backplane glasses for display devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 60 mol. % to about 66 mol. % $SiO_2$;
   from about 7 mol. % to about 10 mol. % $Al_2O_3$;
   from about 14 mol. % to about 18 mol. % $B_2O_3$; and
   from about 9 mol. % to about 16 mol. % alkaline earth oxide, wherein the alkaline earth oxide comprises from about 3 mol. % to about 12 mol. % CaO, from 2 mol. % to 4 mol. % MgO, and from 1 mol. % to 4 mol. % SrO; and
   wherein the glass composition is substantially free from alkali metals and compounds containing alkali metals, is free from heavy metals, and has a liquidus viscosity of greater than or equal to 50 kPoise and a liquidus temperature of less than or equal to 1040° C.

2. The glass composition of claim 1, wherein:
   the glass composition comprises:
   from about 63 mol. % to about 65 mol. % $SiO_2$;
   from 16 mol. % to about 17 mol. % $B_2O_3$.

3. The glass composition of claim 1, wherein the glass composition has a coefficient of thermal expansion which is less than or equal to 40×10$^{-7}$/° C. averaged over a temperature range from 20° C. to 300° C.

4. The glass composition of claim 1, wherein the glass composition has a Young's modulus less than or equal to 10.5 Mpsi.

5. A glass article comprising:
a glass core layer disposed between a first glass cladding layer and a second glass cladding layer, wherein the first glass cladding layer and the second glass cladding layer are formed from a glass composition comprising:
from about 60 mol. % to about 66 mol. % $SiO_2$;
from about 7 mol. % to about 10 mol. % $Al_2O_3$;
from about 14 mol. % to about 18 mol. % $B_2O_3$;
from about 9 mol. % to about 16 mol. % alkaline earth oxide,
wherein the alkaline earth oxide comprises from about 3 mol. % to about 12 mol. % CaO, from 2 mol. % to 4 mol. % MqO, and from 1 mol. % to 4 mol. % SrO; and
wherein the glass composition is substantially free from alkali metals and compounds containing alkali metals, is free from heavy metals, and has a liquidus viscosity of greater than or equal to about 50 kPoise and a liquidus temperature of less than or equal to 1040° C.

6. The glass article of claim 5, wherein the first glass cladding layer and the second glass cladding layer comprise from about 11 mol. % to about 12 mol. % alkaline earth oxide.

7. The glass article of claim 5, wherein the first glass cladding layer and the second glass cladding layer comprise:
from about 63 mol. % to about 65 mol. % $SiO_2$; and
from about 16 mol. % to about 17 mol. % $B_2O_3$.

8. The glass article of claim 5, wherein:
the glass core layer has an average core coefficient of thermal expansion $CTE_{core}$;
the first glass cladding layer and the second glass cladding layer have an average cladding coefficient of thermal expansion $CTE_{clad}$ which is less than the average core coefficient of thermal expansion $CTE_{core}$; and
the first glass cladding layer and the second glass cladding layer are compressively stressed.

9. The glass article of claim 8, wherein the average cladding coefficient of thermal expansion $CTE_{clad}$ is less than or equal to $40 \times 10^{-7}$/° C. in a temperature range from 20° C. to 300° C.

10. The glass article of claim 5, wherein the glass core layer comprises alkali ions.

11. The glass article of claim 5, wherein the first glass cladding layer and the second glass cladding layer have a Young's modulus less than or equal to 10.5 Mpsi.

12. The glass article of claim 5, wherein a first surface of the glass core layer is directly adjacent the first glass cladding layer, and wherein a second surface of the glass core layer is directly adjacent the second glass cladding layer.

13. The glass article of claim 5, wherein a diffusive layer is disposed between the first glass cladding layer or the second glass cladding layer and the glass core layer, and the average coefficient of thermal expansion of the diffusive layer has a value between that of an average core coefficient of thermal expansion of the core and an average cladding coefficient of thermal expansion of the first glass cladding layer or the second glass cladding layer.

* * * * *

UNITED STATES PATENT AND TRADEMARK OFFICE
CERTIFICATE OF CORRECTION

PATENT NO. : 9,764,981 B2
APPLICATION NO. : 14/380164
DATED : September 19, 2017
INVENTOR(S) : John Christopher Mauro It is certified that error appears in the above-identified patent and that said Letters Patent is hereby corrected as shown below:

In the Claims

In Column 16, Line 50, in Claim 1, delete "MqO," and insert -- MgO, --.

In Column 17, Line 13, in Claim 5, delete "MqO," and insert -- MgO, --.

Signed and Sealed this
Third Day of September, 2024

Katherine Kelly Vidal
*Director of the United States Patent and Trademark Office*